K. A. NEUMANN & H. K. ANDREWS.
TEST INDICATOR.
APPLICATION FILED AUG. 6, 1915.
1,167,592.
Patented Jan. 11, 1916.
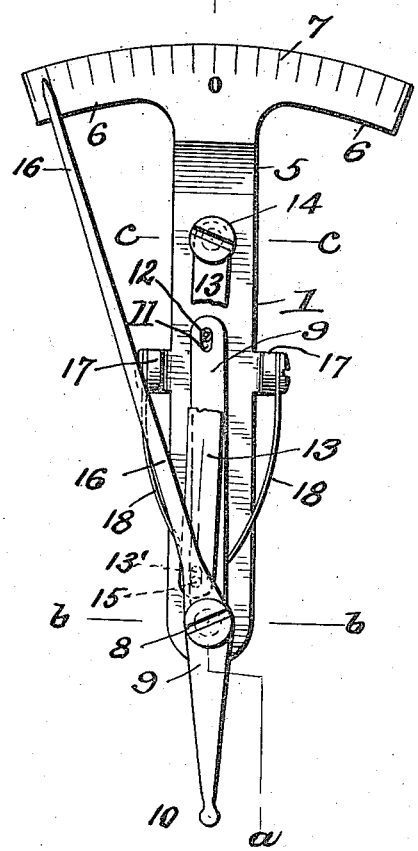
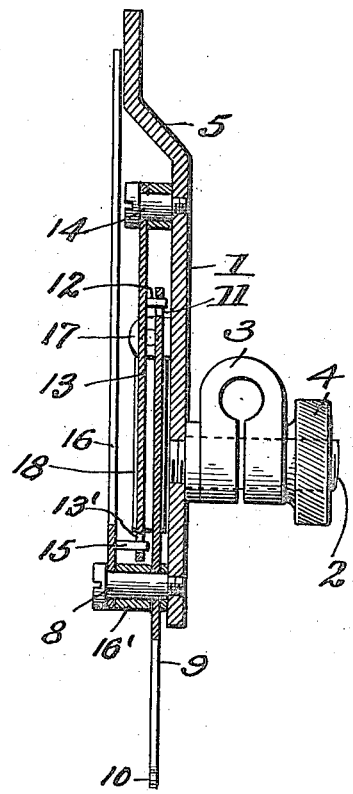
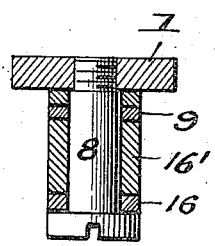
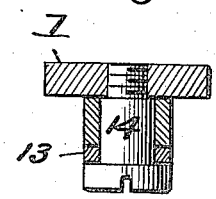
Witnesses
Edward Shea
M. E. Hitchcock
Inventors
K. A. Neumann
H. K. Andrews,
By Mereur D. Blondel
Attorney

UNITED STATES PATENT OFFICE.

KARL A. NEUMANN AND HAROLD K. ANDREWS, OF BRIDGEPORT, CONNECTICUT.

TEST-INDICATOR.

1,167,592.     Specification of Letters Patent.     Patented Jan. 11, 1916.

Application filed August 6, 1915. Serial No. 44,104.

*To all whom it may concern:*

Be it known that we, KARL A. NEUMANN and HAROLD K. ANDREWS, citizens of the United States, residing at Bridgeport, in the county of Fairfield and State of Connecticut, have invented certain new and useful Improvements in Test-Indicators, of which the following is a specification.

Our invention relates to test indicators designed for use by machinists for testing work whereby inaccuracies of the work may be readily detected.

The invention particularly relates to that class of testing indicators employing multiple levers in which the distances measured are greatly enlarged on the indicator, so that the slightest inaccuracy of the work may be readily detected.

The object of the invention is to provide a test indicator of lighter construction and of greater sensitiveness; of less parts, and consequently of cheaper construction than other instruments of this class now upon the market.

The invention consists in certain details of construction and peculiar combinations and arrangements of parts as will hereinafter be fully described and then claimed.

In the drawings, illustrating the invention, in the several figures of which like parts are similarly designated, Figure 1 is a face view of our test indicator on an enlarged scale, the indicator hand being moved to one side of the center and part of the arm being broken away in order to clearly illustrate the several parts of the device. Fig. 2 is a vertical transverse section of the same drawn on the irregular line *a—a* of Fig. 1. Fig. 3 is a horizontal section drawn on a larger scale on the line *b—b* of Fig. 1. Fig. 4 is a horizontal section drawn on a larger scale on the line *c—c* of Fig. 1.

1 designates the base plate of the instrument having a stud-bolt 2 upon which is mounted a split clamping member 3, by which the indicator may be securely fastened to a rod held in the tool holder of the lathe, as when testing cylindrical surfaces held in the lathe, or to receive a rod extending from a suitable holder (not shown), as when testing a flat surface, the said clamping member being securely fastened to the rod or holder by means of a nut 4 threaded upon the outer end of the bolt.

The base 1 is preferably stamped from sheet metal, and its upper end is bent forwardly as at 5 and formed with lateral extensions 6, the face of which is graduated as at 7, and over which operates an indicator hand as will be hereinafter described. It will be noticed that the base thus formed is substantially T-shaped.

In the lower end of the base is threaded a stud-bolt 8, upon which is loosely journaled, intermediate its ends, a lever 9, the extreme lower end of which terminates in a rounded head 10, which we purpose calling a "feeler," and which is designed to engage the work being tested. The upper end of the lever 9 is formed with a short slot 11 into which fits the free end of a pin 12 carried by an arm 13, journaled at its upper end upon a stud-bolt 14 secured to the base 1 above the upper end of the lever 9 and in vertical alinement with the stud-bolt 8. The lower end of the arm 13 is formed with a short slot 13', into which fits the free end of a pin 15 extending from an indicator arm 16, loosely journaled upon the stud-bolt 8. As shown, the said pin 15 extends from the indicator hand adjacent to its pivotal end, and a sleeve or collar 16' of suitable length is interposed between the lever 9 and the indicator hand so that the free end of the latter may work freely and without friction across the face of the graduated head of the base, as will be hereinafter further described.

The base is formed with outwardly extending ears 17 to the outer faces of which are secured the upper ends of flat springs 18 having their lower ends designed for engagement with the sides of the lever 9 and the arm 13, so as to normally hold them and the indicator hand 16 in a neutral position, or, in other words, so that the indicator hand will normally point to the zero mark of the scale 7. The connections between the several levers and the indicator hand will be so proportioned that a movement of one thousandths of an inch of the lower or feeler end of the lever 9 will move the indicator hand one-eighth of an inch, so that the slightest irregularity of the work being tested may be readily detected by the operator.

In the use of our improved indicator, the same is mounted upon and securely made fast to a suitable rod, which, in testing work is held in the lathe chuck), mounted in the tool holder of the lathe, and in such position that the feeler will rest lightly into contact with the work to be tested, so that when the work is rotated and the feeler is moved in one direction or the other, either by means of a cavity or a slight projection upon the work, a correspondingly greater movement will be instantly imparted to the indicator hand and the defect thus readily detected. When our instrument is used upon flat surfaces, it will be understood that it will be mounted upon a rod carried by a suitable stand mounted upon the bed-plate of the testing table. However, as the use of these instruments is well understood to those skilled in the art to which the invention relates, it is not thought necessary to dwell in detail upon the various uses and operations of the invention.

From the foregoing, it will be seen that we provide an exceedingly simple and efficient apparatus for testing work requiring the utmost care and greatest accuracy in finish, and one in which the slightest inaccuracy or defect in the work being tested may be readily indicated. We are aware that other instruments have been provided in which a series of levers are employed for transmitting movement to the indicator hand, but from practical experience, we find that the instruments now upon the market will not accomplish the results of our device, and, furthermore, we have found that our device possesses fewer parts than similar instruments, and consequently can be manufactured at considerably less cost, and by its construction, may be easily cleaned and kept in perfect order. Furthermore, by pivoting the lever 9, intermediate its ends, the "feeling" end of the lever may be more readily inserted into small openings or bores, and the work thus more readily gaged than is possible with other instruments now in use.

What we claim is:—

1. In an indicator, a base, a lever pivoted intermediate its ends upon said base, an arm pivoted at its upper end upon said base and having a pin engaging the upper end of said lever, said arm having a slot in its lower end, and an indicator hand mounted upon the journal of said lever, and having a pin operating in the slot of said arm.

2. In an indicator, a base having its upper end terminating in a head having a scale upon the face thereof, a lever pivoted intermediate its ends upon the lower end of said base and having its lower end terminating in a head adapted to contact with the work being tested, and its upper end provided with a slot, an arm pivoted at its upper end to said base above the upper end of said lever and having a pin adapted to fit within the slot of said lever and its lower end provided with a slot, an indicator hand pivoted upon the journal of said lever and having a pin adapted to operate in the slot of said arm and its upper end extended over the face of the graduations of said base.

3. In an indicator, a base having its upper end terminating in a head having a scale upon the face thereof, a lever pivoted intermediate its ends upon the lower end of said base and having its lower end terminating in a head adapted to contact with the work being tested and its upper end provided with a slot, an arm pivoted at its upper end above the upper end of said lever and having a pin adapted to fit within the slot of said lever and its lower end provided with a slot, an indicator hand pivoted upon the journal of said lever and having a pin adapted to operate in the slot of said arm and its upper end extended over the face of the graduations of said head, and springs carried by said base adapted to engage the edges of said lever and said arm whereby to hold the latter and said indicator hand in a neutral position.

In testimony whereof we have hereunto set our hands this 17th day of July, A. D. 1915.

KARL A. NEUMANN.
HAROLD K. ANDREWS.

Witnesses:
J. ARTHUR PEASE,
M. E. HITCHCOCK.